(12) United States Patent
Kamakura

(10) Patent No.: US 12,535,128 B1
(45) Date of Patent: Jan. 27, 2026

(54) DIFFERENTIAL GEAR MECHANISM

(71) Applicant: TOYOTA JIDOSHA KABUSHIKI KAISHA, Toyota (JP)

(72) Inventor: Koki Kamakura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/066,707

(22) Filed: Feb. 28, 2025

(30) Foreign Application Priority Data

Jul. 25, 2024 (JP) ................. 2024-120248

(51) Int. Cl.
*F16H 48/40* (2012.01)
*F16D 3/06* (2006.01)
*F16H 48/08* (2006.01)

(52) U.S. Cl.
CPC .............. *F16H 48/40* (2013.01); *F16D 3/06* (2013.01); *F16H 48/08* (2013.01); *F16H 2048/082* (2013.01)

(58) Field of Classification Search
CPC .... F16H 48/40; F16H 48/08; F16H 2048/082; F16H 57/037; F16D 3/06
See application file for complete search history.

(56) References Cited

U.S. PATENT DOCUMENTS

| 6,117,038 A | * | 9/2000 | Nishiji | ................. B60K 17/346 475/221 |
| 2025/0010706 A1 | * | 1/2025 | Barrientos Blacno | ....................... B60K 23/08 |

FOREIGN PATENT DOCUMENTS

| JP | S6162640 A | * | 3/1986 |
| JP | 2011-075109 A | | 4/2011 |

* cited by examiner

*Primary Examiner* — Lori Wu
(74) *Attorney, Agent, or Firm* — SoraIP, Inc.

(57) ABSTRACT

This differential gear mechanism is provided with a case member having a cylindrical housing portion and held so as to be rotatable about a center axis of the housing portion, a pinion gear provided inside the housing portion so as to be revolvable about a center axis of the housing portion, and a side gear to which a torque is transmitted from the pinion gear and an output shaft is connected, and a side gear is provided with a pinion gear. A meshing gear portion and a boss portion protruding toward the rear side of the gear portion are provided, and the output shaft is connected to the side gears at a boss portion side rather than a border portion between the gear portion and the boss portion in the rotation center axis direction of the side gears.

5 Claims, 1 Drawing Sheet

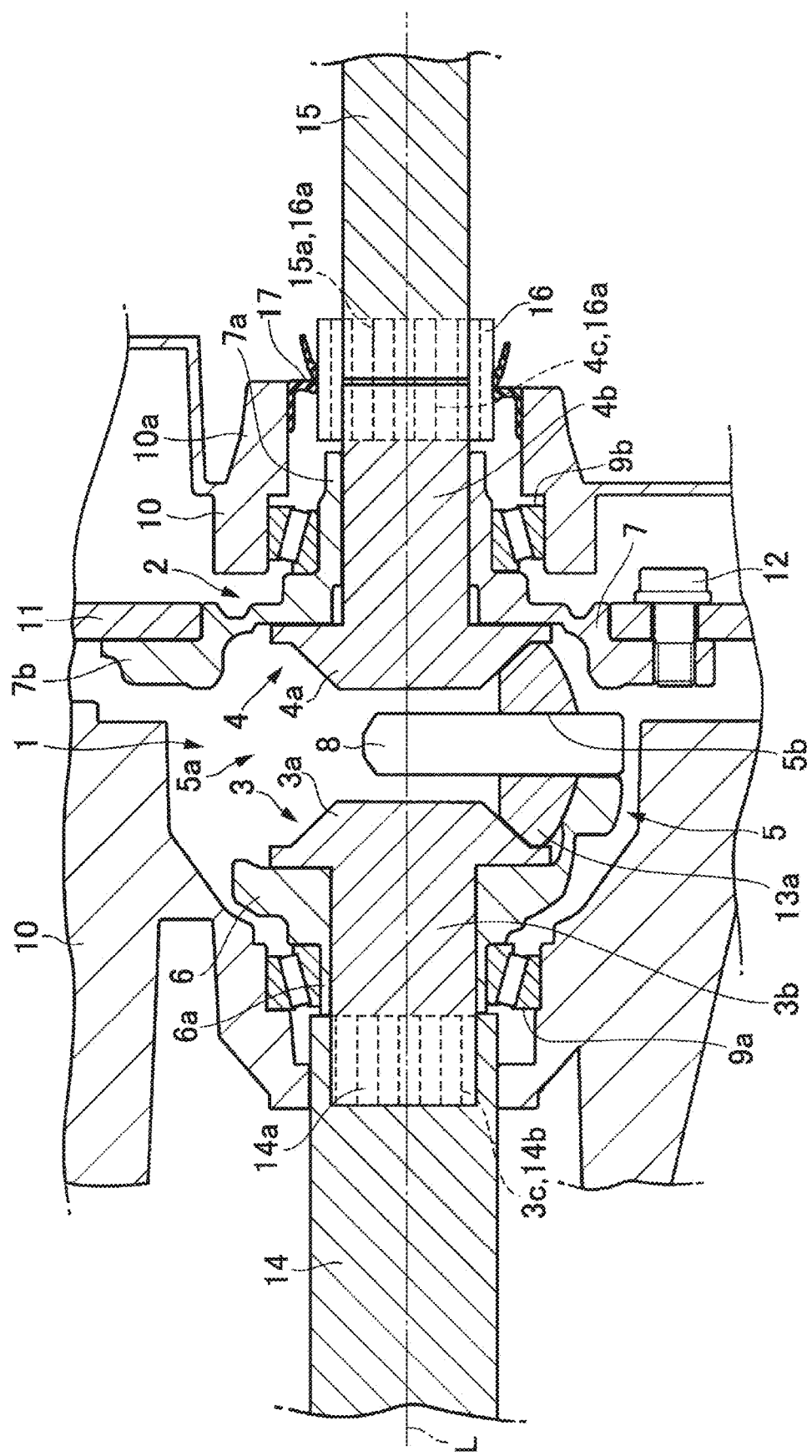

DIFFERENTIAL GEAR MECHANISM

CROSS-REFERENCE TO RELATED APPLICATION

This application claims priority to Japanese Patent Application No. 2024-120248 filed on Jul. 25, 2024. The disclosure of the above-identified application, including the specification, drawings, and claims, is incorporated by reference herein in its entirety.

BACKGROUND

1. Technical Field

The present disclosure relates to a differential gear mechanism that links two gears facing each other so as to be capable of differential rotation.

2. Description of Related Art

Japanese Unexamined Patent Application Publication No. 2011-75109 (JP 2011-75109 A) discloses a differential gear mechanism that is made up of a case member that is held so as to be rotatable, a plurality of pinion gears that revolve around a rotation center axis of the case member and that are also rotatably held in the case member, and two side gears that are disposed facing each other in a rotation center axis direction of the case member and that also mesh with the pinion gears. Each of the side gears includes a gear portion that is formed with meshing teeth that mesh with the pinion gears, and a shaft portion that is rotatably fitted to the case member. The side gears are formed with through holes along the rotation center axis.

SUMMARY

Regarding each of the side gears described in JP 2011-75109 A, a drive shaft and a propeller shaft are connected thereto, for example, and torque that is transmitted between a rotating member on an input side of the differential gear mechanism, and a rotating member on an output side of the differential gear mechanism such as the drive shaft, the propeller shaft, and so forth, acts on the side gear. Accordingly, rigidity (strength) of the gear portion in the side gear is set based on the maximum value of torque that is anticipated to be transmitted through the differential gear mechanism. Therefore, an outer diameter dimension of the side gear having a hollow portion described in JP 2011-75109 A is limited to a dimension corresponding to an inner diameter dimension of a through hole, and to a thickness dimension corresponding to rigidity that is required of the gear portion of the side gear, and accordingly there is room for technical improvement in order to reduce the size of the side gear.

The present disclosure has been made in light of the foregoing technical issue, and accordingly an object thereof is to provide a differential gear mechanism in which the size of the side gear can be reduced.

In order to achieve the above object, according to the present disclosure, a differential gear mechanism includes a case member that includes a housing portion that is fashioned in a cylindrical shape and that is also held so as to be rotatable about a center axis of the housing portion, a pinion gear that is provided inside the housing portion so as to be rotatable and also to be revolvable around the center axis of the housing portion, and a side gear that rotates under transmission of torque from the pinion gear, and also to which an output shaft is connected.

The side gear includes a gear portion on which meshing teeth that mesh with the pinion gear are fashioned on an outer peripheral face, and a boss portion that protrudes to a rear face side of the gear portion, and in a rotation center axis direction of the side gear, the output shaft is connected to the side gear at a position on a side closer to the boss portion than a boundary portion between the gear portion and the boss portion.

Further, in the present disclosure, spline teeth may be fashioned on an outer peripheral face of an end portion of the boss portion that is on an opposite side from the gear portion in the rotation center axis direction of the side gear, and the output shaft may include a recessed portion in which spline teeth that mesh with the spline teeth of the boss portion are fashioned on an inner face.

Also, in the present disclosure,
spline teeth may be fashioned on an outer peripheral face of an end portion of the boss portion that is on an opposite side from the gear portion in the rotation center axis direction of the side gear,
spline teeth may be fashioned on an outer peripheral face of a distal end portion of the output shaft, and
the differential gear mechanism may further include a cylindrical member in which spline teeth, that mesh with spline teeth that are fashioned on the boss portion and with spline teeth that are fashioned on the output shaft, are fashioned on an inner face of the cylindrical member.

Also, in the present disclosure, the case member may include a side wall portion facing a rear face of the gear portion in the side gear,
the boss portion may be provided passing through the side wall portion, and
the output shaft may be connected to a portion of the boss portion passing through the side wall portion.

Further, in the present disclosure, the gear portion may be fashioned as a solid gear portion.

According to the present disclosure, the side gear to which torque is transmitted from the case member via the pinion gear includes the gear portion that meshes with the pinion gear, and the boss portion that protrudes at the rear face side of the gear portion, and the output shaft is connected to the side gear at a position on the side closer to the boss portion than the boundary portion between the gear portion and the boss portion. Accordingly, there is no need to form a relatively large through hole for engaging the output shaft on an inner side of the gear portion, and accordingly the size of the gear portion can be reduced. Also, the rigidity that is required of the gear portion is a rigidity based on a load in a rotational direction being applied from the pinion gear, and a radial load, and thus rigidity of an engagement portion for transmitting torque with the output shaft is not required. Accordingly, the rigidity that is required of the gear portion can be reduced, and hence the gear portion can be further reduced in size.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a cross-sectional view for explaining an example of a differential gear mechanism according to an embodiment of the present disclosure.

DETAILED DESCRIPTION OF EMBODIMENTS

The present disclosure will be described with reference to the embodiments shown in the drawings. Note that the embodiments described below are merely examples of a case where the present disclosure is embodied, and are not intended to limit the present disclosure.

A cross-sectional view for explaining an example of a differential gear mechanism according to an embodiment of the present disclosure is illustrated in FIG. 1. The differential gear mechanism 1 shown in FIG. 1 is configured such that a case member (hereinafter, referred to as a differential case) 2, a left side gear 3, and a right side gear 4 perform differential rotation. The left side gear 3 and the right side gear 4 correspond to the "side gear" in the embodiment of the present disclosure.

Differential case 2 includes a cylindrical housing portion 5 for accommodating the side gears 3 and 4, an annular left side wall portion 6 formed at one end portion of the housing portion 5 (the left end portion in FIG. 1), and an annular right side wall portion 7 formed at the other end portion of the housing portion 5 (the right end portion in FIG. 1). The left side wall portion 6 and the right side wall portion 7 correspond to the "side wall portion" in the embodiment of the present disclosure.

In the housing portion 5, a window-hole 5a is formed at a predetermined circumferential distance so as to secure a mounting space for a member provided around the differential case 2 and to insert the side gears 3 and 4 therein. In addition, a through hole 5b into which one end portion of a pinion shaft 8 to be described later is fitted is formed in a wall portion of the housing portion 5 at a predetermined interval in the circumferential direction. The pinion shaft 8 shown in FIG. 1 is constituted by a so-called spider shaft three formed radially from the center axis L of the differential case 2.

The left side wall portion 6 is integrally formed with a cylindrical portion 6a protruding from the inner peripheral outer surface thereof toward the rotational axis L of the housing portion 5, and the cylindrical portion 6a is rotatably held in the transmission housing 10 via a tapered needle bearing 9a.

Similarly, the right side wall portion 7 is integrally formed with a cylindrical portion 7a protruding from the inner peripheral outer surface thereof in the rotational axis L direction of the housing portion 5, the cylindrical portion 7a is rotatably held in the transmission housing 10 via the tapered needle bearing 9b. That is, the differential case 2 is rotatably held by the transmission housing 10 about the rotation center axis L of the housing portion 5.

Further, a flange portion 7b is formed on the right side wall portion 7, and an input member 11 formed in a ring shape is fixed to the flange portion 7b by a bolt 12. The input member 11 may be a ring gear or the like that inputs torque to a conventional differential gear mechanism.

The pinion gear 13 is rotatably fitted to the pinion shaft 8. Therefore, as the differential case 2 rotates, the pinion gear 13 revolves around the rotation center axis L of the housing portion 5. The pinion gear 13 is constituted by a bevel gear. Further, a surface (back surface) 13a of the pinion gear 13 facing the wall surface of the differential case 2 is formed in a convex spherical shape. Similarly, in the differential case 2, the inner surface of the part facing the pinion gear 13 is formed in a concave spherical shape having substantially the same curvature as the back surface 13a of the pinion gear 13. A spherical washer or the like may be provided to suppress frictional drag between the back surface 13a of the pinion gear 13 and the inner surface of the differential case 2.

Note that the differential case 2 is not limited to being integrally formed, and may be configured by fastening a plurality of members by bolts or the like in consideration of the assemblability of the pinion gear 13, the pinion shaft 8, and the side gears 3 and 4.

The left side gear 3 is a solid member in which the left side gear portion 3a and the left side boss portion 3b protruding from the rear surface side of the left side gear portion 3a in the axis L direction (left side in FIG. 1) are integrally formed. The left side gear portion 3a is constituted by a bevel gear having a conical surface formed with meshing teeth meshing with the pinion gears 13, and a rear surface thereof faces the left side wall portion 6. An elastic member such as an annular shim for adjusting the meshing length between the left side gear 3 and each pinion gear 13 or an annular disc spring for pressing the left side gear 3 toward each pinion gear 13 in order to maintain the meshing between the left side gear 3 and each pinion gear 13 may be provided between the rear surface of the left side gear portion 3a and the left side wall portion 6.

Further, the left side boss portion 3b is formed to have an outer diameter substantially the same as the inner diameter of the cylindrical portion 6a, and is rotatably held in the cylindrical portion 6a. A bearing such as a bush may be provided between the cylindrical portion 6a and the left side boss portion 3b.

The rear end portion (the left end portion in FIG. 1) of the left side boss portion 3b is formed to protrude from the cylindrical portion 6a. In other words, the left side boss portion 3b is provided through the left side wall portion 6. A left drive shaft 14 is integrally rotatably connected to a part protruding from the cylindrical portion 6a. That is, the left drive shaft 14 is connected to the left side gear 3 on the left side boss portion 3b side of the border between the left side gear portion 3a and the left side boss portion 3b, in the rotation center axis L direction.

In the embodiment illustrated in FIG. 1, an outer diameter of the left drive shaft 14 is larger than an outer diameter of the left side boss portion 3b, and a recessed portion 14a having a predetermined depth formed in a circular cross section is formed on an end face of the left drive shaft 14. The left side boss portion 3b is inserted into the recessed portion 14a and is splined. That is, spline teeth 14b, 3c are formed on the inner peripheral face of the left drive shaft 14 and the outer peripheral face of the left side boss portion 3b so as to mesh with each other in the rotational direction of the left drive shaft 14.

The left drive shaft 14 is rotatably held by the transmission housing 10 via a bush (not shown) or the like.

Similarly to the left side gear 3, the right side gear 4 is a solid member in which the right side gear portion 4a and the right side boss portion 4b protruding from the rear surface side of the right side gear portion 4a in the axis L direction (right side in FIG. 1) are integrally formed. The right side gear portion 4a is constituted by a bevel gear having a conical surface formed with meshing teeth meshing with the pinion gears 13, and a rear surface thereof faces the right side wall portion 7. An elastic member such as an annular shim for adjusting the meshing length between the right side gear 4 and each pinion gear 13 or an annular disc spring for pressing the right side gear 4 toward each pinion gear 13 in order to maintain the meshing between the right side gear 4 and each pinion gear 13 may be provided between the rear surface of the right side gear portion 4a and the right side wall portion 7.

Further, the right side boss portion 4b is formed to have an outer diameter substantially the same as the inner diameter of the cylindrical portion 7a, and is rotatably held in the cylindrical portion 7a. A bearing such as a bush may be provided between the cylindrical portion 7a and the right side boss portion 4b.

The rear end portion (the right end portion in FIG. 1) of the right side boss portion 4b is formed to protrude from the cylindrical portion 7a. In other words, the right side boss portion 4b is provided through the right side wall portion 7. The right drive shaft 15 is integrally rotatably connected to a part protruding from the cylindrical portion 7a. That is, the right drive shaft 15 is connected to the right side gear 4 at the right side boss portion 4b side of the border between the right side gear portion 4a and the right side boss portion 4b in the rotation center axis L direction.

In the embodiment illustrated in FIG. 1, the outer diameter of the right drive shaft 15 is the same as the outer diameter of the right side boss portion 4b. Spline teeth 4c, 15a of the same phase are formed on the outer peripheral face of the rear end portion of the right side boss portion 4b and the outer peripheral face of the distal end portion (the right end portion in FIG. 1) of the right drive shaft 15. The left drive shaft 14 and the right drive shaft 15 described above correspond to the "output shaft" in the embodiment of the present disclosure.

In the embodiment shown in FIG. 1, cylindrical sleeves 16 are provided which mesh with the splined teeth 4c, 15a described above. In other words, spline teeth 16a having the same phase as the respective spline teeth 4c, 15a are formed on the inner peripheral face of the sleeves 16. The spline teeth 16a of the sleeves 16 are engaged with the spline teeth 4c formed on the right side boss portion 4b and the spline teeth 15a formed on the right drive shaft 15 so that the right side gear 4 and the right side drive shaft 15 rotate integrally. The sleeve 16 corresponds to a "cylindrical member" in an embodiment of the present disclosure.

In the embodiment shown in FIG. 1, a cylindrical portion 10a is formed in the transmission housing 10, and the sleeves 16 are fitted to the cylindrical portion 10a via the sealing member 17.

In the differential gear mechanism 1 configured as described above, three rotating elements of the differential case 2 and the side gears 3 and 4 are differentially rotated. That is, when the vehicle on which the differential gear mechanism 1 is mounted is traveling straight, since the left and right wheels rotate at the same rotational speed, the differential case 2, each side gear 3, 4 rotates at the same rotational speed. Further, in accordance with the resistance torque acting on the left and right drive shafts 14 and 15 from the drive wheel side, the torque transmitted from the drive force source (not shown) to the differential case 2 is divided and acts on the side gears 3 and 4.

On the other hand, when the vehicle on which the differential gear mechanism 1 configured as described above is mounted is turning travels, the rotation speed of the drive wheels on the outer ring side is higher than the rotation speed of the drive wheels on the inner ring side. In such a case, the pinion gear 13 rotates to allow relative rotation between the side gear 3 (4) connected to the outer ring and the side gear 4 (3) connected to the inner ring. That is, the differential case 2 rotates at a rotational speed based on the rotational speed of the driving force source, and the side gears 3 and 4 rotate relative to each other. In other words, the differential case 2 and the side gears 3 and 4 are rotated differentially.

Also, in the case where the vehicle is traveling in a turning direction, as in the case where the vehicle is traveling in a straight direction, the torque transmitted from the driving force source (not shown) to the differential case 2 is divided in accordance with the resistance torque acting on the left and right drive shafts 14 and 15 from the drive wheel side, and acts on the side gears 3 and 4.

By connecting the drive shafts 14 and 15 to the boss portion 3b, 4b as described above, there is no need to form a relatively large through hole for engaging the drive shafts 14 and 15 inside the gear portion 3a, 4a in the rotation center axis L direction of the side gears 3 and 4, so that the gear portion 3a, 4a can be reduced in size (reduced in diameter).

Further, the rigidity (strength) required for the gear portion 3a, 4a is a rigidity based on a rotational load acting from the pinion gear 13 and a radial load. On the other hand, in a case where a through hole is formed as in a conventional side gear and a drive shaft is spline-engaged with the through hole, rigidity based on a load acting on spline teeth is required in addition to the rigidity based on the load. In other words, the thickness between the base of the gear portion 3a, 4a and the base of the splined teeth needs to be increased. Therefore, the required stiffness of the gear portion 3a, 4a can be reduced more than that of the side gear having the conventional through hole formed therein, so that the gear portion 3a, 4a can be further reduced in size.

In order to reduce the weight of the side gears 3 and 4, through holes may be formed in the side gears 3 and 4 while maintaining the rigidity based on the load in the rotational direction acting from the pinion gear 13 and the radial load. Specifically, a through hole having an inner diameter defined so that the wall thickness between the root of the gear portion 3a, 4a and the inner wall surface of the through hole can satisfy the above-described stiffness may be formed.

In addition, the outer diameter of the boss portion 3b, 4b may be set to a size that can satisfy the torsional rigidity for transmitting torque and the rigidity with respect to the load acting on the splined teeth.

As described above, since the gear portion 3a, 4a accommodated in the differential case 2 can be reduced in size, the outer diameter dimension of the differential case 2 can be reduced, and the mountability of the differential gear mechanism 1 can be improved.

In the above-described embodiment, a configuration in which the left side boss portion 3b and the left drive shaft 14 are coupled to each other and a configuration in which the right side boss portion 4b and the right drive shaft 15 are coupled to each other are different from each other. However, the configuration in which the left side boss portion 3b and the left drive shaft 14 are coupled to each other and the configuration in which the right side boss portion 4b and the right drive shaft 15 are coupled to each other may be the same configuration in which any one of the above configurations is employed. Further, there is no particular limitation on the configuration in which the hollow portion is formed at the rear end portion of the boss portion 3b (4b) and the drive shaft 14 (15) is coupled to the boss portion 3b (4b), for example, in which the drive shaft 14 (15) is splined to the hollow portion.

What is claimed is:

1. A differential gear mechanism, comprising:
a case member that includes a cylindrical housing portion, the case member being configured to be held such that the case member is rotatable about a center axis of the housing portion;
a pinion gear that is provided inside the housing portion and is configured to be rotatable, the pinion gear being revolvable around the center axis of the housing portion; and
a side gear configured to rotate under transmission of torque from the pinion gear, the side gear being connected to an output shaft, wherein:
the side gear includes a gear portion on which meshing teeth that mesh with the pinion gear are provided on an outer peripheral face, and a boss portion that protrudes to a rear face side of the gear portion;
in a rotation center axis direction of the side gear, the output shaft is connected to the side gear at a position on a side closer to the boss portion than a boundary portion between the gear portion and the boss portion;
the case member further includes a side wall portion facing a rear face of the gear portion of the side gear and extending in the rotation center axis direction;
the boss portion is provided passing through the side wall portion;
the output shaft is connected to a connection portion of the boss portion that is not covered by the side wall portion;
a tapered needle bearing is provided on the side wall portion on a side that the connection portion is present with respect to the rotation center axis direction of the side gear, the tapered needle bearing being not overlapping with the connection portion as viewed in a radial direction in which a rotation center axis of the side gear serves as a center;
a back surface of the pinion gear facing an inner wall surface of the case member is in a convex spherical shape; and
the inner wall surface of the case member is in a concave spherical shape having the same curvature as the back surface of the pinion gear.

2. The differential gear mechanism according to claim 1, wherein:
spline teeth are provided on an outer peripheral face of the connection portion, the connection portion being an end portion of the boss portion that is on an opposite side from the gear portion in the rotation center axis direction of the side gear; and
the output shaft includes a recessed portion in which spline teeth that mesh with the spline teeth of the boss portion are provided on an inner face.

3. The differential gear mechanism according to claim 1, wherein the gear portion is provided as a solid gear portion.

4. The differential gear mechanism according to claim 1, further comprising an elastic member provided between the rear face of the gear portion and the side wall portion of the case member.

5. The differential gear mechanism according to claim 4, wherein the elastic member includes an annular shim and an annular disc spring.

* * * * *